Patented June 19, 1923.

1,458,992

UNITED STATES PATENT OFFICE.

WALTER T. SCHEELE, OF HACKENSACK, NEW JERSEY, ASSIGNOR TO H. MORTIMER SPECHT, OF NEW YORK, N. Y.

PRODUCTION OF CAMPHORIC ACID.

No Drawing. Application filed November 24, 1920. Serial No. 426,131.

To all whom it may concern:

Be it known that I, WALTER T. SCHEELE, a citizen of the State of Germany, and having declared my intention of becoming a citizen of the United States of America, residing at 325 Main Street, Hackensack, in the county of Bergen and State of New Jersey, have invented certain new and useful Improvements in the Production of Camphoric Acid, of which the following is a specification.

This invention relates to the production of camphoric acid and has for its object to provide a new and improved process whereby camphoric acid may be readily produced from pinene.

In accordance with the present invention pinene is treated with a suitable peroxide such as sodium peroxide, whereby an energetic action occurs and a product which I assume to be a peroxide derivative of pinene is produced. This product when treated with water yields camphoric acid, and this acid may be reduced to camphor in any known or suitable manner.

In order to illustrate the operation of the process, the following example is given, but it is to be understood that the invention is not limited thereto.

10 parts of a 10% solution of sodium peroxide in absolute ethyl alcohol are introduced into an autoclave with 90 parts of commercial pinene completely dehydrated, and the temperature is maintained at between 60-80° C. for about two hours when a powerful reaction sets in. The temperature ascends rapidly, and may reach about 140° C., and the autoclave should be cooled preferably with ice. The reaction is almost immediately completed and the liquid remaining in the autoclave is poured into water. A white crystalline precipitate appears which upon drying has a strong camphoric odour and which under the microscope exhibits the characteristic forms of camphoric acid. The camphoric acid may be reduced to camphor, preferably by the process described and claimed in the specification of my divisional application Serial No. 457,035 filed March 30th, 1921, but any other suitable or known method may be used. While I find ethyl alcohol is well adapted for use in the specific example given above, the invention is not limited thereto as the treatment of pinene with an alkaline peroxide in the solid state or dissolved in any suitable solvent is contemplated by the present invention. It is necessary that the solvent shall be miscible with the pinene without interacting therewith. The solvent must be substantially free from water because of the ready reaction between the water and the sodium peroxide.

While it is preferred to use sodium peroxide in the treatment of pinene, it is to be understood that any other suitable peroxide may be used such as potassium peroxide.

I claim:—

1. The process of making camphoric acid which consists in treating pinene with an alkaline peroxide, and treating the product with water.

2. The process of making camphoric acid which consists in treating pinene with a solution of an alkaline peroxide, and treating the product with water.

3. The process of making camphoric acid which consists in treating pinene with a solution of an alkaline peroxide, warming in a closed vessel, and treating the product with water.

4. The process of making camphoric acid, which consists in treating pinene with a solution of an alkaline peroxide in alcohol, and treating the product with water.

5. The process of making camphoric acid, which consists in treating pinene with a solution of an alkaline peroxide in alcohol, warming in a closed vessel and treating the product with water.

6. The process of making camphoric acid which consists in treating pinene with sodium peroxide, and treating the product with water.

7. The process of making camphoric acid, which consists in treating pinene with a solution of sodium peroxide and treating the product with water.

8. The process of making camphoric acid which consists in treating pinene with a solution of sodium peroxide, warming in a closed vessel and treating the product with water.

9. The process of making camphoric acid which consists in treating pinene with a solution of sodium peroxide in alcohol, and treating the product with water.

10. The process of making camphoric acid which consists in treating pinene with a solution of sodium peroxide in alcohol, warming in a closed vessel and treating the product with water.

11. The process of making camphoric acid, which consists in treating pinene with a solution of an alkaline peroxide in ethyl alcohol, and treating the product with water.

12. The process of making camphoric acid, which consists in treating pinene with a solution of an alkaline peroxide in ethyl alcohol, warming in a closed vessel and treating the product with water.

13. The process of making camphoric acid which consists in treating pinene with a solution of sodium peroxide in ethyl alcohol, and treating the product with water.

14. The process of making camphoric acid which consists in treating pinene with a solution of sodium peroxide in ethyl alcohol, warming in a closed vessel and treating the product with water.

In testimony whereof I affix my signature.

WALTER T. SCHEELE.